(12) United States Patent  
Ishigaki et al.

(10) Patent No.: US 9,083,146 B1  
(45) Date of Patent: Jul. 14, 2015

(54) SOLID STATE LASER DEVICE

(71) Applicant: SHIMADZU CORPORATION, Kyoto-shi, Kyoto (JP)

(72) Inventors: Naoya Ishigaki, Kyoto (JP); Koji Tojo, Kyoto (JP); Shingo Uno, Kyoto (JP); Jiro Saikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/213,016

(22) Filed: Mar. 14, 2014

(51) Int. Cl.
    *H01S 3/10*     (2006.01)
    *H01S 3/109*     (2006.01)
    *H01S 3/094*     (2006.01)

(52) U.S. Cl.
    CPC ................. *H01S 3/109* (2013.01); *H01S 3/094* (2013.01)

(58) Field of Classification Search
    CPC .................................. H01S 3/109; H01S 3/094
    USPC .......................................................... 372/22
    See application file for complete search history.

(56) References Cited

U.S. PATENT DOCUMENTS

2005/0008047 A1*    1/2005    Hashimoto et al. ............. 372/22

FOREIGN PATENT DOCUMENTS

JP      2010-251448 A      11/2010

* cited by examiner

*Primary Examiner* — Tuan Nguyen
(74) *Attorney, Agent, or Firm* — Sughrue Mion, PLLC

(57) ABSTRACT

During temperature tuning, first, the temperature of a third harmonic generating element is swept to determine the optimal temperature Ttp of the third harmonic generating element in a state where the temperature of a second harmonic generating element has been set to a temperature shifted away from the vicinity of the optimal temperature. Next, the temperature of second harmonic generating element is swept to determine the optimal temperature Tsp of the second harmonic generating element in a state where the temperature of the third harmonic generating element has been set to a temperature shifted away from the vicinity of the optimal temperature.

5 Claims, 5 Drawing Sheets

SOLID STATE LASER DEVICE

CROSS-REFERENCE TO RELATED APPLICATIONS

The entire contents of Japanese Patent Publication No. 2013-065753 to the same inventors, published Apr. 11, 2013, are incorporated herein by reference.

TECHNICAL FIELD

The present invention relates to a solid state laser device, more specifically, to a solid state laser device which allows temperature tuning to be performed with high precision and without outputting a laser having high energy.

BACKGROUND ART

Solid state laser devices which perform temperature tuning of the optical elements for wavelength conversion automatically or with an instructed timing are known in the prior art (see for example Patent literature 1).

PRIOR ART LITERATURES (Patent literature 1) Japanese Unexamined Patent Application Publication 2010-251448

SUMMARY OF THE INVENTION

The laser of a solid state laser device during actual operation has high energy, and in a conventional solid state laser device as described above, the laser outputted during temperature tuning likewise has high energy.

However, there is the problem that, if the laser irradiation target or an object other than the laser irradiation target is needlessly irradiated with a high energy laser during temperature tuning, damage thereto cannot be avoided.

If the drive current of the semiconductor laser is reduced in response to this, the output of a high energy laser can be prevented, but the range of change in output and change in drive current during temperature tuning also become small, creating the problem that it becomes difficult to perform high precision temperature tuning.

It is thus an object of the present invention to provide a solid state laser device capable of performing high precision temperature tuning without outputting a laser having high energy.

In a first aspect, the present invention provides a solid state laser device (100) characterized in that it includes: a semiconductor laser (1) which generates an excitation laser light; a solid state laser medium (2) which is excited by said excitation laser light and generates a fundamental wave; a second harmonic generating element (4) and third harmonic generating element (5), arranged inside an optical resonator (20) formed containing said solid state laser medium (2), for generating a third harmonic of the fundamental wave generated in said optical resonator (20); a first temperature controller (9s, 11s) for controlling the temperature of said second harmonic generating element (4); a second temperature controller (9t, 11t) for controlling the temperature of said third harmonic generating element (5); a third harmonic output detector (7, 8) which detects the third harmonic output; and a temperature tuning mechanism (12) which sweeps the temperature of said third harmonic generating element (5) to determine the optimal temperature Ttp in a state where the temperature of said second harmonic generating element (4) has been set to a temperature shifted away from the vicinity of the optimal temperature, and which sweeps the temperature of said second harmonic generating element (4) to determine the optimal temperature Tsp in a state where the temperature of said third harmonic generating element (5) has been set to a temperature shifted away from the vicinity of the optimal temperature.

In the solid state laser device (100) according to the first aspect described above, the temperature of the third harmonic generating element (5) is swept to determine the optimal temperature Ttp in a state where the temperature of the second harmonic generating element (4) has been set to a temperature shifted away from the vicinity of the optimal temperature, so a laser having high energy is not outputted even if the drive current of the semiconductor laser (1) is high. Furthermore, the temperature of the second harmonic generating element (4) is swept to determine the optimal temperature Tsp in a state where the temperature of the third harmonic generating element (5) has been set to a temperature shifted away from the optimal temperature, so a laser having high energy is not outputted even if the drive current of the semiconductor laser (1) is high. Moreover, the drive current of the semiconductor laser (1) can be made high, so the range of change in output and change in drive current during temperature tuning becomes large, making it possible to perform high precision temperature tuning.

In a second aspect, the present invention provides a solid state laser device (100) characterized in that, in the solid state laser device (100) according to the first aspect described above, said temperature tuning mechanism (12) sweeps the temperature in a state where said semiconductor laser (1) is driven at a constant driving current.

With the solid state laser device (100) according to the second aspect described above, the drive current of the semiconductor laser (1) can be increased, thus increasing the range of change of output during temperature tuning and making it possible to perform high precision temperature tuning.

In a third aspect, the present invention provides a solid state laser device (100) characterized in that, in the solid state laser device (100) according to the second aspect described above, the temperature to which the temperature of said second harmonic generating element (4) is shifted away from the vicinity of the optimal temperature is a temperature such that the output when said third harmonic generating element (5) is at the optimal temperature Ttp will be 50% or less of the output when said second harmonic generating element (4) is at the optimal temperature Tsp and said third harmonic generating element (5) is at the optimal temperature Ttp; and the temperature to which the temperature of said third harmonic generating element (5) is shifted away from the vicinity of the optimal temperature is a temperature such that the output when said second harmonic generating element (4) is at the optimal temperature Tsp will be 50% or less of the output when said second harmonic generating element (4) is at the optimal temperature Tsp and said third harmonic generating element (5) is at the optimal temperature Ttp.

With the solid state laser device (100) according to the third aspect described above, the maximum output during temperature tuning becomes half or less of the output when the second harmonic generating element (4) is at the optimal temperature Tsp and the third harmonic generating element (5) is at the optimal temperature Ttp.

In a fourth aspect, the present invention provides a solid state laser device (100) characterized in that, in the solid state laser device (100) according to the first aspect described above, said temperature tuning mechanism (12) sweeps the temperature in a state where said semiconductor laser (1) is driven so as to have a constant output.

With the solid state laser device (100) according to the fourth aspect described above, the drive current of the semiconductor laser (1) can be increased, thus increasing the range of change of drive current during temperature tuning and making it possible to perform high precision temperature tuning.

In a fifth aspect, the present invention provides a solid state laser device (100) characterized in that, in the solid state laser device (100) according to the fourth aspect described above, the temperature to which the temperature of said second harmonic generating element (4) is shifted away from the vicinity of the optimal temperature is a temperature such that the drive current when the third harmonic generating element (5) is at the optimal temperature Ttp will be 150% or more of the drive current when said second harmonic generating element (4) is at the optimal temperature Tsp and said third harmonic generating element (5) is at the optimal temperature Ttp; and the temperature to which the temperature of said third harmonic generating element (5) is shifted away from the vicinity of the optimal temperature is a temperature such that the drive current when said second harmonic generating element (4) is at the optimal temperature Tsp will be 150% or more of the drive current when said second harmonic generating element (4) is at the optimal temperature Tsp and said third harmonic generating element (5) is at the optimal temperature Ttp.

With the solid state laser device (100) according to the fifth aspect described above, the range of change of the drive current during temperature tuning becomes 1.5 times or greater as compared to the drive current when the second harmonic generating element (4) is at the optimal temperature Tsp and the third harmonic generating element (5) is at the optimal temperature Ttp.

With the solid state laser device of the present invention, unnecessary irradiation of the laser irradiation target, etc. with a high energy laser pulse during temperature tuning is prevented, making it possible to avoid problems such as destruction of the laser irradiation target, etc. Furthermore, the range of change in output and of change in drive current during temperature tuning can be increased, thus making it possible to perform high precision temperature tuning.

DETAILED DESCRIPTION OF THE EXEMPLARY EMBODIMENTS

Figure 1:
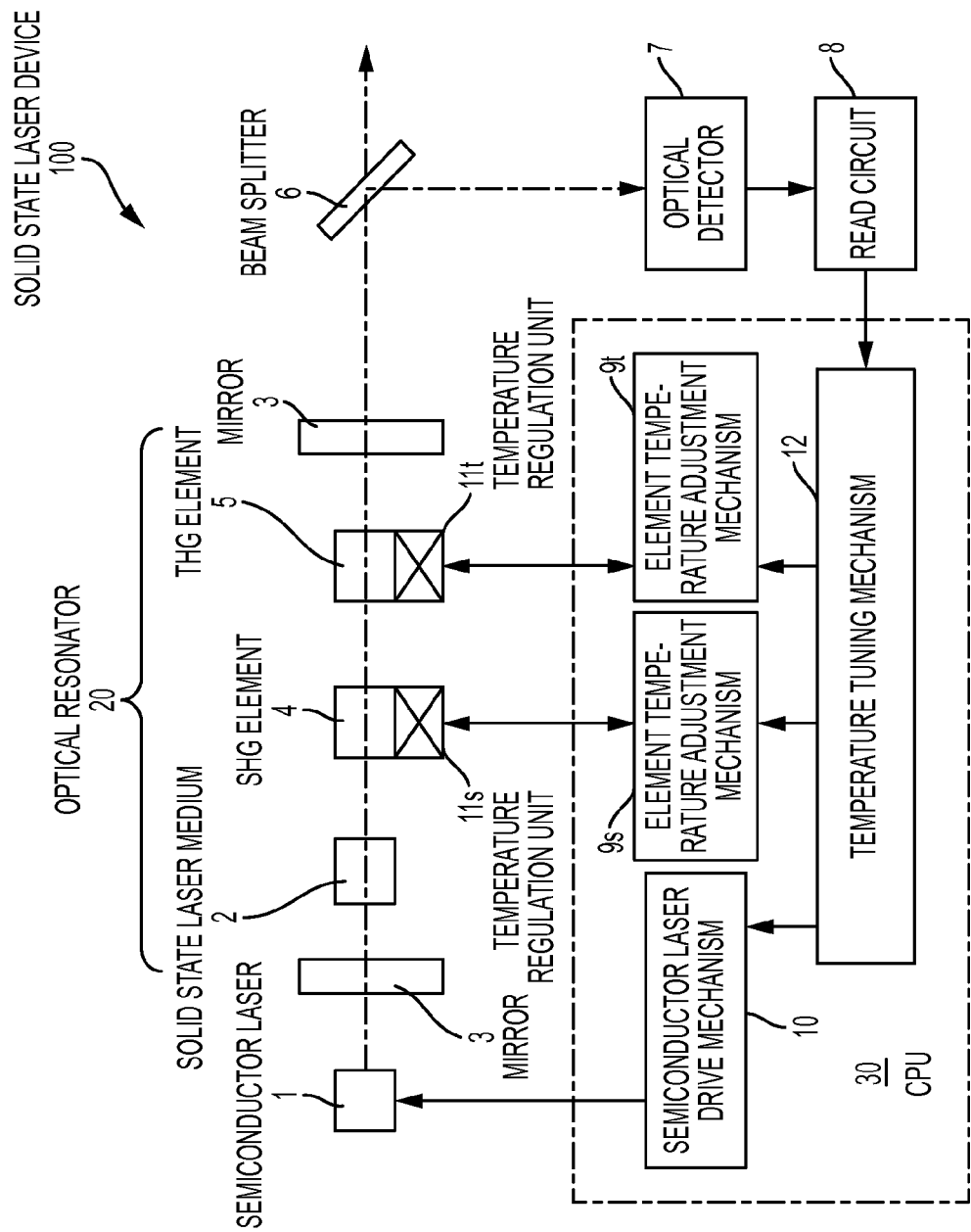
FIG. 1 is an explanatory diagram illustrating a solid state laser device pertaining to Example of Embodiment 1 and Example of Embodiment 2.

The present invention will be described in more detail below using the examples of embodiment shown in the drawings. It should be noted that the present invention is not limited by these examples.

Example of Embodiment 1

FIG. 1 is an explanatory diagram showing the solid state laser device 100 pertaining to Example of Embodiment 1.

This solid state laser device 100 includes a semiconductor laser 1 which generates an excitation laser light; a solid state laser medium 2 which is excited by the excitation laser light and generates a fundamental wave; mirrors 3, 3 which contain the solid state laser medium 2 and constitute a resonator 20; a second harmonic generating element 4 and third harmonic generating element 5, which are arranged inside an optical resonator 20 for generating a third harmonic of the fundamental wave generated in the optical resonator 20; an element temperature control mechanism 9s and a temperature regulation unit 11s (containing a Peltier element and temperature sensor) for controlling the temperature of the second harmonic generating element 4; an element temperature control mechanism 9t and temperature regulation unit 11t for controlling the temperature of the third harmonic generating element 5; a beam splitter 6 which splits off a portion of the third harmonic output; a light detector 7 which receives the light split off by the beam splitter 6; a read circuit 8 (containing an AD conversion circuit) which reads the light detection signal in the light detector 7; a semiconductor laser drive mechanism 10 for driving the semiconductor laser 1; and a temperature tuning mechanism 12 which sweeps the temperature of the third harmonic generating element 5 to determine the optimal temperature Ttp in a state where the temperature of the second harmonic generating element 4 has been set to a temperature shifted away from the vicinity of the optimal temperature, and which sweeps the temperature of the second harmonic generating element 4 to determine the optimal temperature Tsp in a state where the temperature of the third harmonic generating element 5 has been set to a temperature shifted away from the vicinity of the optimal temperature.

The element temperature adjustment mechanisms 9s, 9t, the semiconductor laser drive mechanism 10 and the temperature tuning mechanism 12 are constituted by means of a CPU 30.

Figure 2:
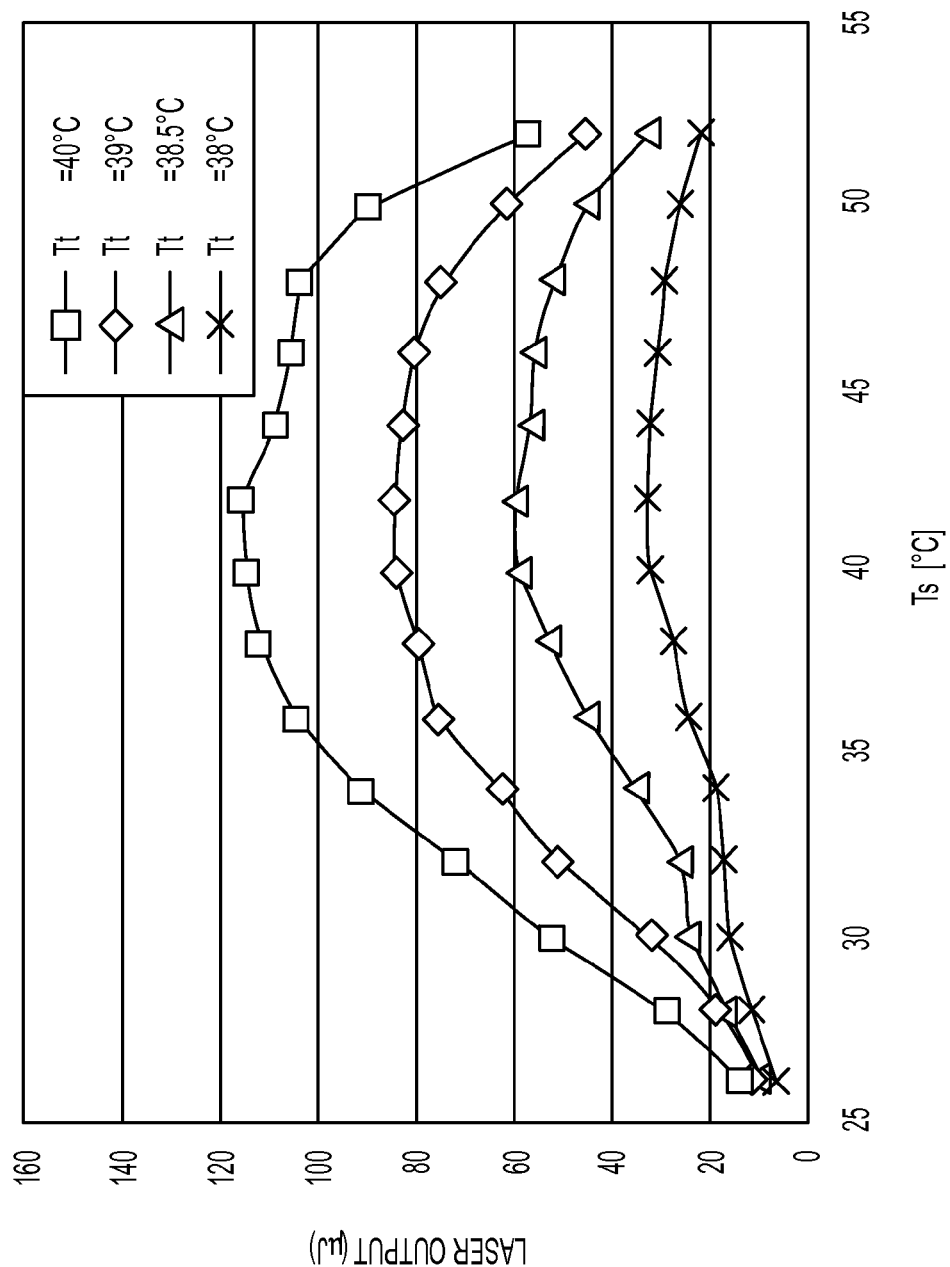
FIG. 2 is a graph showing output change in relation to temperature change of a second harmonic generating element.

FIG. 2 is a graph showing the change in third harmonic output in relation to change in temperature Ts of the second harmonic generating element 4. The drive current I is 5 A.

Even if the temperature Tt of the third harmonic generating element 5 differs, the temperature of the second harmonic generating element 4 at which the output approaches maximum, i.e. the optimal temperature Tsp, is approximately 42° C.

Figure 3:
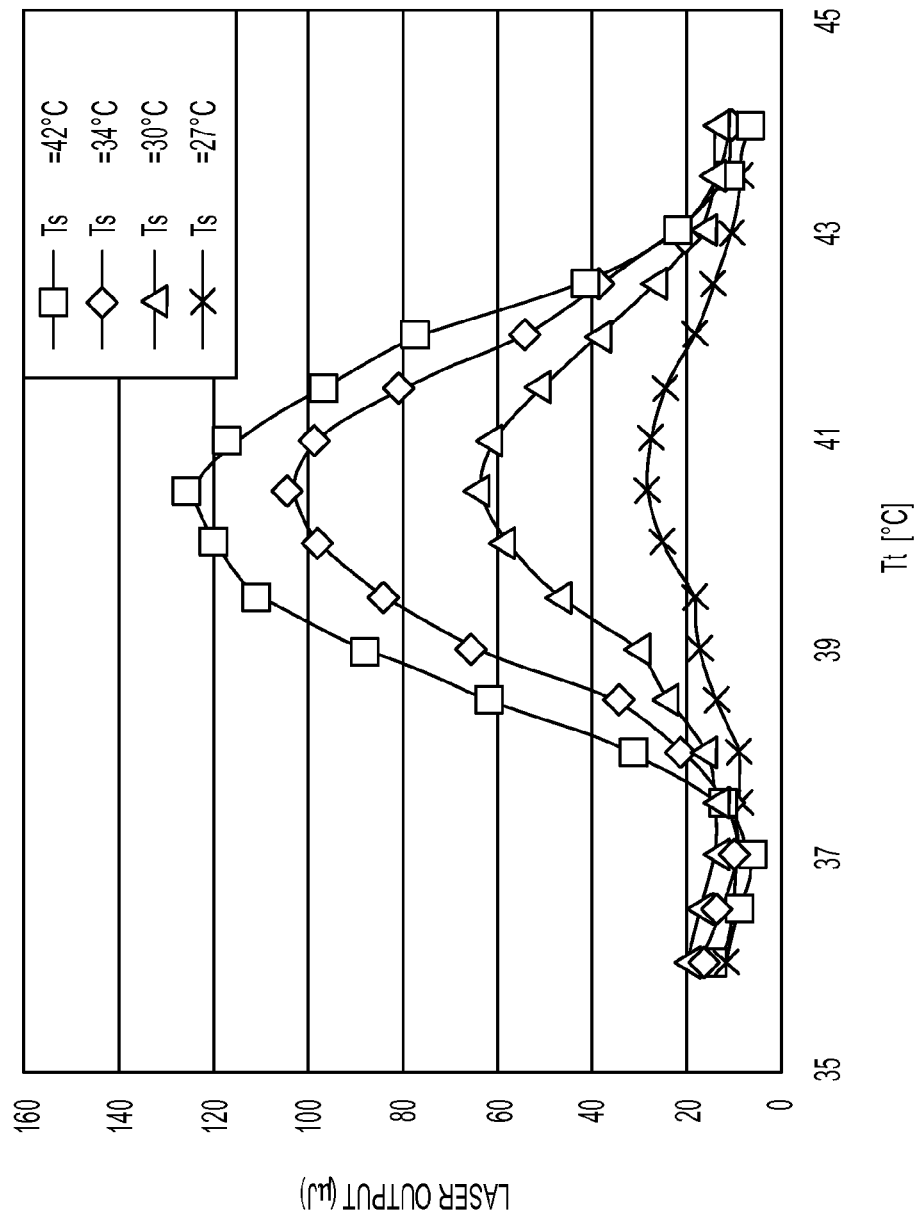
FIG. 3 is a graph showing output change in relation to temperature change of a third harmonic generating element.

FIG. 3 is a graph illustrating change in third harmonic output in relation to change in temperature Tt of the third harmonic generating element 5. The drive current I is 5 A.

Even if the temperature Ts of the second harmonic generating element 4 differs, the temperature of the third harmonic generating element 5 at which the output approaches maximum, i.e. the optimal temperature Ttp, is approximately 41° C.

The following can be seen from FIG. 2 and FIG. 3.

(1) If the second harmonic generating element 4 is at optimal temperature Tsp=approximately 42° C. and the third harmonic generating element 5 is at optimal temperature Ttp=approximately 41° C., the output reaches its maximum value (approximately 125 µJ).

(2) If the temperature Ts of the second harmonic generating element 4 is set for example to 30° C., even if the third harmonic generating element 5 is set to the optimal temperature Ttp=approximately 41° C., the output will be at no more than half of the maximum value (approximately 62 µJ). Furthermore, when the temperature Tt of the third harmonic generating element 5 is varied for example between 39° C. and 43° C., the range of change in output will be adequately large, at approximately 40 μJ (=62 μJ–20 μJ), making it easy to precisely detect the optimal temperature Ttp.

(3) If the temperature Ts of the second harmonic generating element 4 is set for example to 27° C., even if the third harmonic generating element 5 is set to the optimal temperature Ttp=approx. 41° C., the output will be at no more than half of the maximum value (approximately 62 μJ). However, the range of change in output when the temperature Tt of the third harmonic generating element 5 is varied for example between 39° C. and 43° C. will be approximately 20 μJ (=30 μJ=10 μJ), making it more difficult to precisely detect the optimal temperature Ttp than when the temperature Ts of the second harmonic generating element 4 was set for example to 30° C.

(4) If the temperature Tt of the third harmonic generating element 5 is set for example to 38.5° C., even if the second harmonic generating element 4 is set to an optimal temperature Tsp=approximately 42° C., the output will be at no more than half of the maximum value (approximately 60 μJ). Furthermore, the range of change in output when the temperature Ts of the second harmonic generating element 4 is varied for example between 30° C. and 50° C. will be adequate large, at approximately 35 μJ (=60 μJ–25 μH), making it easy to precisely detect the optimal temperature Tsp.

(5) If the temperature Tt of the third harmonic generating element 5 is set for example to 38° C., even if the second harmonic generating element 4 is set to an optimal temperature Tsp=approximately 42° C., the output will be at no more than half of the maximum value (approximately 30 μJ). However, the range of change in output when the temperature Ts of the second harmonic generating element 5 is varied between 30° C. and 50° C. will be approximately 20 μJ (=35 μJ–15 μJ), making it more difficult to precisely detect the optimal temperature Tsp than when the temperature Ts of the third harmonic generating element 5 was set for example to 38.5° C.

Figure 4:
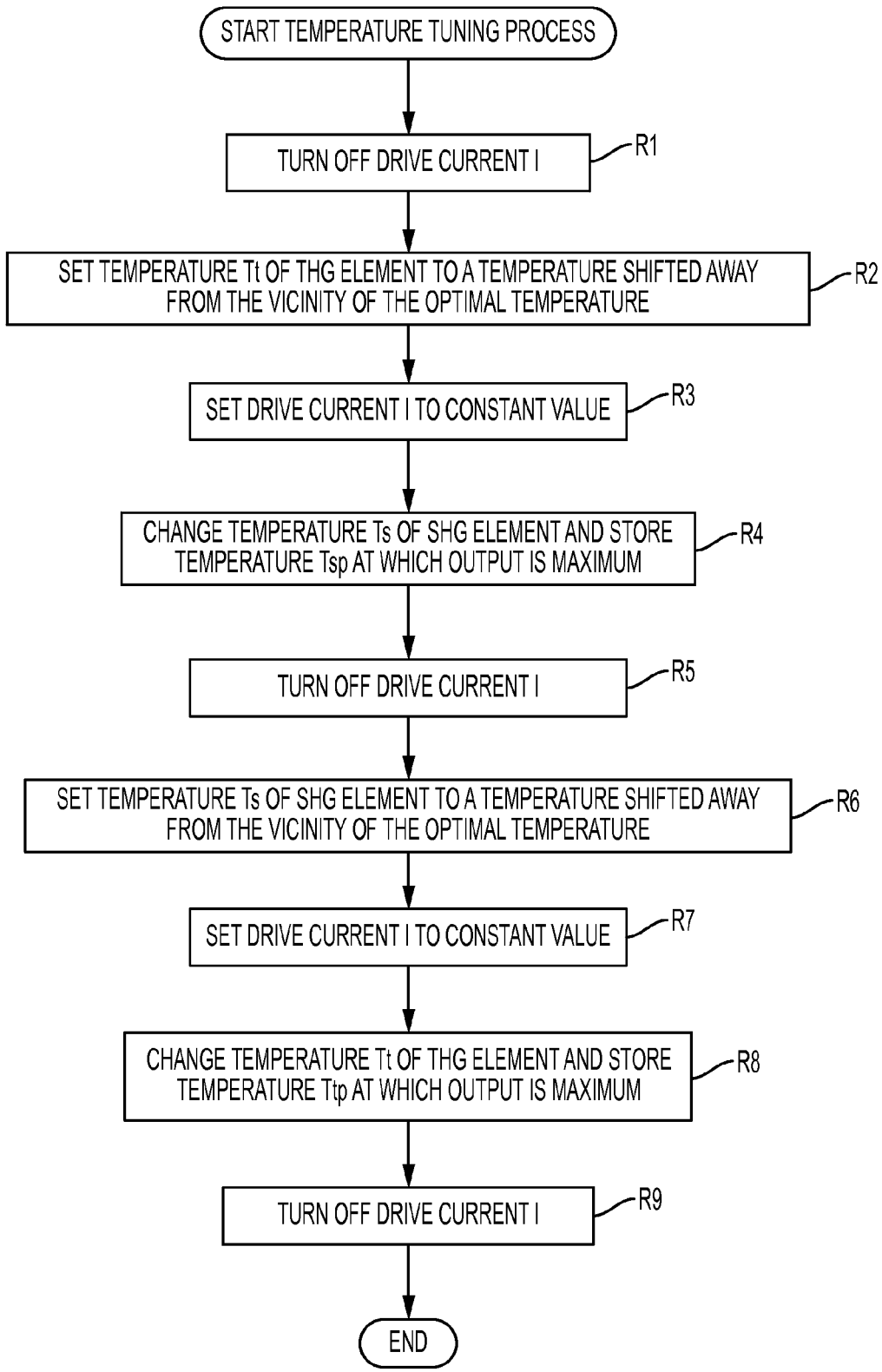
FIG. 4 is a flow chart showing the temperature tuning process pertaining to Example of Embodiment 1.

FIG. 4 is a flow chart illustrating the temperature tuning process pertaining to Example of Embodiment 1.

In step R1, the temperature tuning mechanism 12 turns off the drive current I supplied from the semiconductor laser drive mechanism 10 and stops the generation of excitation laser light from the semiconductor laser 1.

In step R2, the temperature tuning mechanism 12 sets the temperature Tt of the third harmonic generating element 5 to a temperature shifted away from the vicinity of the optimal temperature, for example, to 38.5° C., using the element temperature control mechanism 9t and the temperature regulation unit 11t. The reason for setting the temperature to Tt=38.5° C. is based on (4) and (5) above.

In step R3, the temperature tuning mechanism 12 sets the drive current I supplied from the semiconductor laser drive mechanism 10 to a constant value. The value of this drive current I may be either about the same or lower than during normal operation. However, if it is made too low, the range of change in output when the temperature Ts of the second harmonic generating element 4 is varied and the range of change in output when the temperature Tt of the third harmonic generating element 5 is varied will become small, making it more difficult to precisely detect the optimal temperatures Tsp and Ttp, so it is best not to lower this value too much.

In step R4, the temperature tuning mechanism 12 varies the temperature Ts of the second harmonic generating element 5 for example between 30° C. and 50° C., using the element temperature control mechanism 9s and temperature regulation unit 11s, and detects and stores the optimal temperature Tsp at which the output reaches a peak.

In step R5, the temperature tuning mechanism 12 turns off the drive current I supplied from the semiconductor laser drive mechanism 10, and stops the generation of excitation laser light from the semiconductor laser 1.

In step R6, the temperature tuning mechanism 12 sets the temperature Ts of the second harmonic generating element 4 to a temperature shifted away from the vicinity of the optimal temperature, for example, to 30° C., using the element temperature control mechanism 9s and temperature regulation unit 11s. The reason for setting the temperature to Ts=30° C. is based on (2) and (3) above.

In step R7, the temperature tuning mechanism 12 sets the drive current I supplied from the semiconductor laser drive mechanism 10 to a constant value.

In step R8, the temperature tuning mechanism 12 varies the temperature Tt of the third harmonic generating element 5 for example between 39° C. and 43° C., using the element temperature control mechanism 9t and temperature regulation unit 11t, and detects and stores the optimal temperature Ttp at which the output reaches a peak.

In step R9, the temperature tuning mechanism 12 turns off the drive current I supplied from the semiconductor laser drive mechanism 10, stops the generation of excitation laser light from the semiconductor laser 1, and terminates processing.

At the time of the next operation, the temperature tuning mechanism 12 sets the temperature Ts of the second harmonic generating element 4 to the optimal temperature Tsp using element temperature control mechanism 9s and temperature regulation unit 11s. It furthermore sets the temperature Tt of the third harmonic generating element 5 to the optimal temperature Ttp using element temperature control mechanism 9t and temperature regulation unit 11t.

With the solid state laser device 100 of Example of Embodiment 1, the laser irradiation target, etc. is not needlessly irradiated with a high energy laser during temperature tuning, so the problem of the laser irradiation target, etc. being damaged can be avoided. Furthermore, the range of change in output during temperature tuning can be increased, thus making it possible to perform high precision temperature tuning.

Example of Embodiment 2

Figure 5:
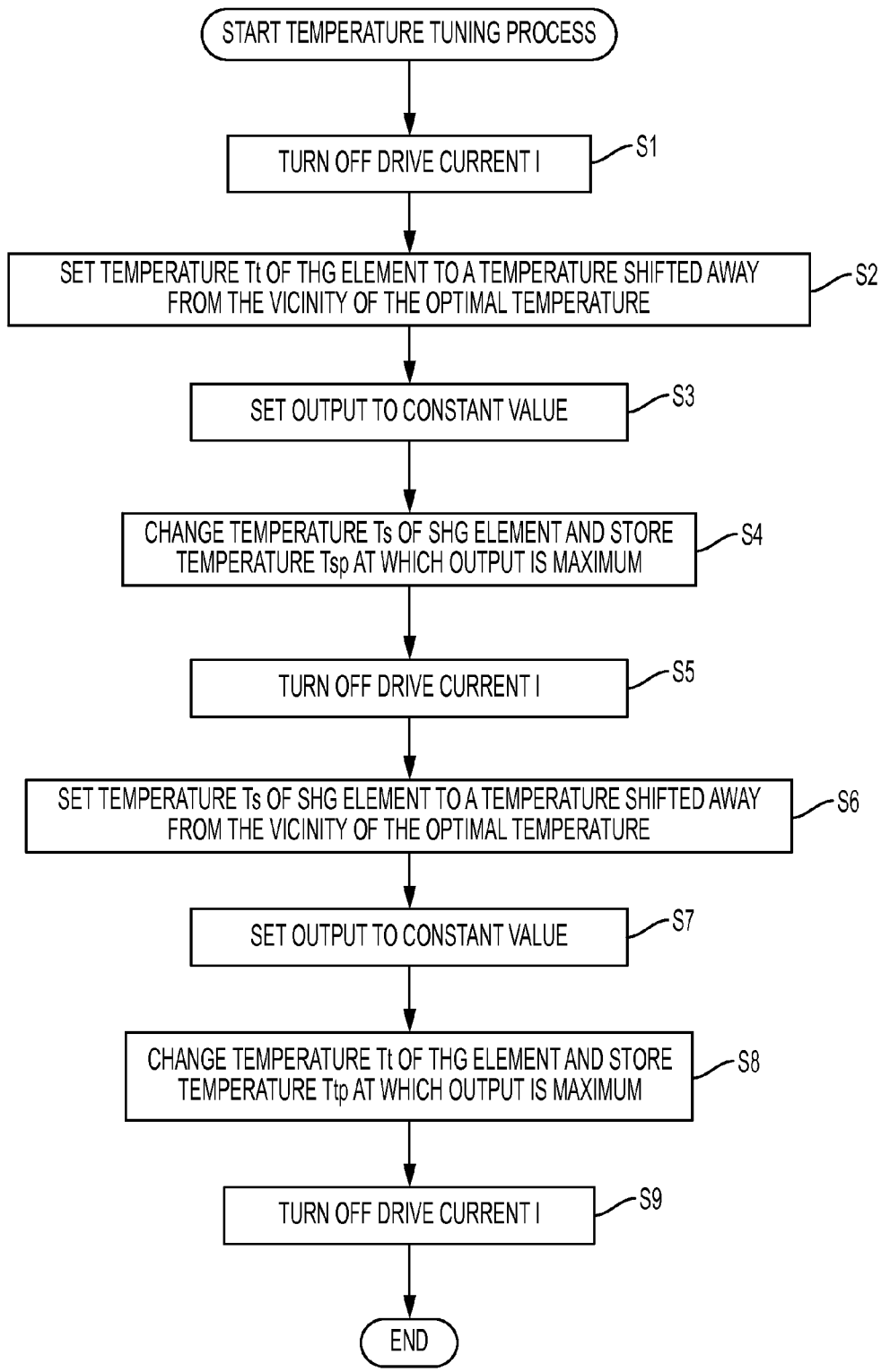
FIG. 5 is a flow chart showing the temperature tuning process pertaining to Example of Embodiment 2.

FIG. 5 is a flow chart illustrating the temperature tuning process pertaining to Example of Embodiment 2.

In step S1, the temperature tuning mechanism 12 turns off the drive current I supplied from the semiconductor laser drive mechanism 10 and stops the generation of excitation laser light from the semiconductor laser 1.

In step S2, the temperature tuning mechanism 12 sets the temperature Tt of the third harmonic generating element 5 to a temperature shifted away from the vicinity of the optimal temperature, for example, to 38.5° C., using the element temperature control mechanism 9t and the temperature regulation unit 11t. The reason for setting the temperature to Tt=38.5° C. is based on (4) and (5) above.

In step S3, the temperature tuning mechanism 12 sets the drive current I supplied from the semiconductor laser drive mechanism 10 so that the output will be constant. The output value here may be made the approximately the same or lower than during normal operation. However, if it is made too low, the range of change in drive current I when the temperature Ts of the second harmonic generating element 4 is varied and the range of change in drive current I when the temperature Tt of the third harmonic generating element 5 is varied will become small, making it more difficult to precisely detect the optimal temperatures Tsp and Ttp, so it is best not to lower this value too much.

In step S4, the temperature tuning mechanism 12 varies the temperature Ts of the second harmonic generating element 5 for example between 30° C. and 50° C., using the element temperature control mechanism 9s and the temperature regulation unit 11s, and detects and stores the optimal temperature Tsp at which the drive current I reaches bottom.

In step S5, the temperature tuning mechanism 12 turns off the drive current I supplied from the semiconductor laser drive mechanism 10, and stops the generation of excitation laser light from the semiconductor laser 1.

In step S6, the temperature tuning mechanism 12 sets the temperature Ts of the second harmonic generating element 4 to a temperature shifted away from the vicinity of the optimal temperature, for example, to 30° C., using the element temperature control mechanism 9s and temperature regulation unit 11s. The reason for setting the temperature to Ts=30° C. is based on (2) and (3) above.

In step S7, the temperature tuning mechanism 12 controls the drive current I supplied from the semiconductor laser drive mechanism 10 so that the output will be constant.

In step S8, the temperature tuning mechanism 12 varies the temperature Tt of the third harmonic generating element 5 for example between 39° C. and 43° C., using the element temperature control mechanism 9t and temperature regulation unit 11t, and detects and stores the optimal temperature Ttp at which the drive current I reaches bottom.

In step S9, the temperature tuning mechanism 12 turns off the drive current I supplied from the semiconductor laser drive mechanism 10, stops the generation of excitation laser light from the semiconductor laser 1, and terminates processing.

At the time of next operation, the temperature tuning mechanism 12 sets the temperature Ts of the second harmonic generating element 4 to the optimal temperature Tsp using element temperature control mechanism 9s and temperature regulation unit 11s. It furthermore sets the temperature Tt of the third harmonic generating element 5 to the optimal temperature Ttp using element temperature control mechanism 9t and temperature regulation unit 11t.

With the solid state laser device 100 of Example of Embodiment 2, the laser irradiation target, etc. is not needlessly irradiated with a high energy laser during temperature tuning, so the problem of the laser irradiation target, etc. being damaged can be avoided. Furthermore, the range of change in drive current I during temperature tuning can be increased, thus making it possible to perform high precision temperature tuning.

FIELD OF INDUSTRIAL APPLICATION

The present invention can be used in the bioengineering field and in the measurement field.

DESCRIPTION OF REFERENCES

1 Semiconductor laser
2 Solid state laser medium
3 Mirror
4 Second harmonic generating element
5 Third harmonic generating element
6 Beam splitter
7 Light detector
8 Read circuit
9s, 9t Element temperature adjustment mechanism
10 Semiconductor laser drive mechanism
11s, 11t Temperature regulation unit
12 Temperature tuning mechanism
20 Optical resonator
30 CPU
100 Solid state laser device

What is claimed is:

1. A solid state laser device, comprising:
   a semiconductor laser which generates an excitation laser light;
   a solid state laser medium which is excited by said excitation laser light and generates a fundamental wave;
   a second harmonic generating element and third harmonic generating element, arranged inside an optical resonator formed containing said solid state laser medium, for generating a third harmonic of the fundamental wave generated in said optical resonator;
   a first temperature controller for controlling the temperature of said second harmonic generating element;
   a second temperature controller for controlling the temperature of said third harmonic generating element;
   a third harmonic output detector which detects the third harmonic output; and
   a temperature tuning mechanism which sweeps the temperature of said third harmonic generating element to determine the optimal temperature Ttp in a state where the temperature of said second harmonic generating element has been set to a temperature shifted away from the vicinity of the optimal temperature, and which sweeps the temperature of said second harmonic generating element to determine the optimal temperature Tsp in a state where the temperature of said third harmonic generating element has been set to a temperature shifted away from the vicinity of the optimal temperature.

2. The solid state laser device as described in claim 1, wherein said temperature tuning mechanism sweeps the temperature in a state where said semiconductor laser is driven at a constant driving current.

3. The solid state laser device as described in claim 2, wherein the temperature to which the temperature of said second harmonic generating element is shifted away from the vicinity of the optimal temperature is a temperature such that the output when said third harmonic generating element is at the optimal temperature Ttp will be 50% or less of the output when said second harmonic generating element is at the optimal temperature Tsp and said third harmonic generating element is at the optimal temperature Ttp; and
   the temperature to which the temperature of said third harmonic generating element is shifted away from the vicinity of the optimal temperature is a temperature such that the output when said second harmonic generating element is at the optimal temperature Tsp will be 50% or less of the output when said second harmonic generating element is at the optimal temperature Tsp and said third harmonic generating element is at the optimal temperature Ttp.

4. The solid state laser device as described in claim 1, said temperature tuning mechanism sweeps the temperature in a state where said semiconductor laser is driven so as to have a constant output.

5. The solid state laser device as described in claim 4, the temperature to which the temperature of said second harmonic generating element is shifted away from the vicinity of the optimal temperature is a temperature such that the drive current when the said third harmonic generating element is at the optimal temperature Ttp will be 150% or more of the drive current when said second harmonic generating element is at the optimal temperature Tsp and said third harmonic generating element is at the optimal temperature Ttp; and the temperature to which the temperature of said third harmonic generating element is shifted away from the vicinity of the optimal temperature is a temperature such that the drive current when said second harmonic generating element is at the optimal temperature Tsp will be 150% or more of the drive current when said second harmonic generating element is at the optimal temperature Tsp and said third harmonic generating element is at the optimal temperature Ttp.

* * * * *